United States Patent [19]
Craig

[11] Patent Number: 5,353,153
[45] Date of Patent: Oct. 4, 1994

[54] REFLECTING DEVICE

[76] Inventor: Dennis Craig, P.O. Box 35, Hadlock, Wash. 98339

[21] Appl. No.: 959,036

[22] Filed: Oct. 8, 1992

[51] Int. Cl.⁵ .................................................. G02B 5/12
[52] U.S. Cl. ...................................... 359/523; 359/515
[58] Field of Search ............... 359/515, 520, 522, 523, 359/524

[56] References Cited

U.S. PATENT DOCUMENTS

| | | | |
|---|---|---|---|
| 2,344,542 | 3/1944 | Fike | 359/523 |
| 3,924,928 | 12/1975 | Trimble | 359/523 |
| 3,951,517 | 4/1976 | Levy et al. | 359/523 |
| 4,017,151 | 4/1977 | Kagayama | 359/523 |
| 4,575,789 | 3/1986 | Tsuyama | 359/523 |

Primary Examiner—Loha Ben
Assistant Examiner—Michael A. Papalas

[57] ABSTRACT

An improved bicycle wheel reflector having two equal sized wings, of rigid plane construction coated with reflective material of different colors, so that the color of the surface of one wing is the same as the opposite surface of the other wing, the wings extending from their apex at a fixed 10 to 20 degree angle from horizontal, and being of rectangular shape, and being of sufficient length to extend beyond the radius of the bicycle tire, yet short enough so as to not interfere with the free travel of the wheel, and being provided an alternating pair of slots at the apex of the wings so as to engage the spokes of any bicycle wheel, so that the lights of oncoming traffic are reflected in a flashing pattern for better visibility of the bicycle in darkness.

1 Claim, 2 Drawing Sheets

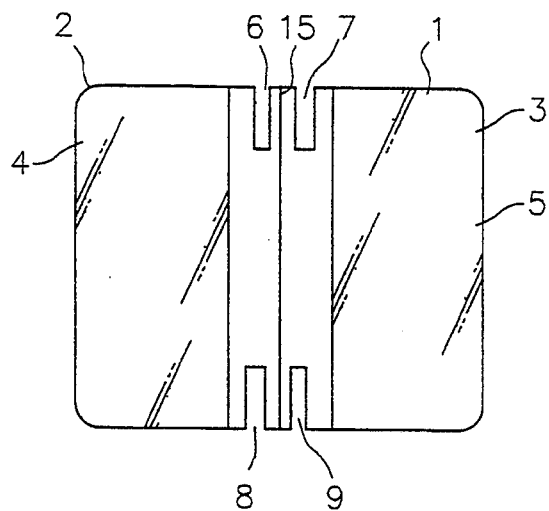
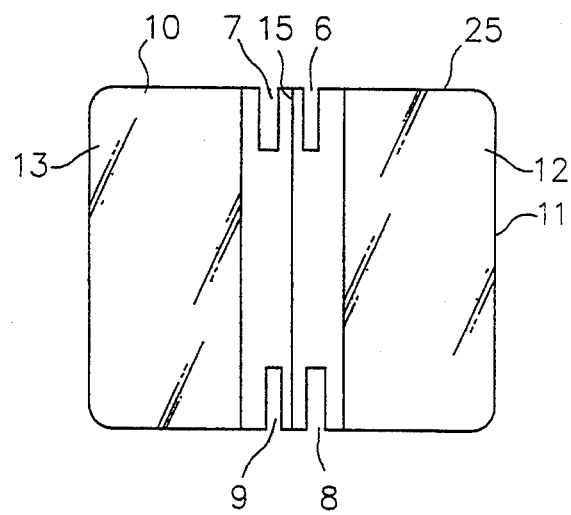
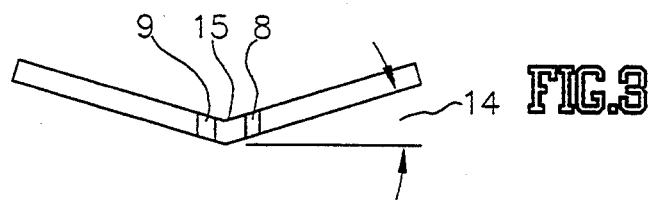
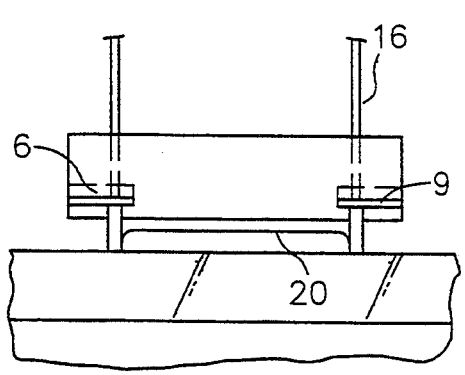
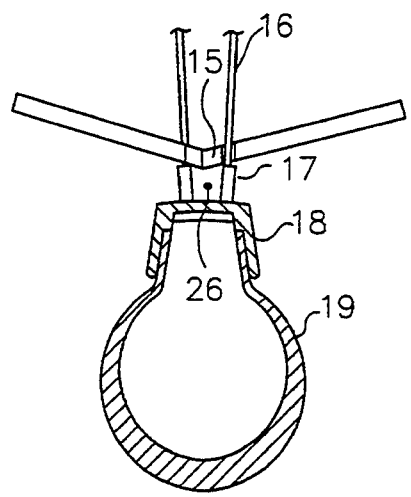

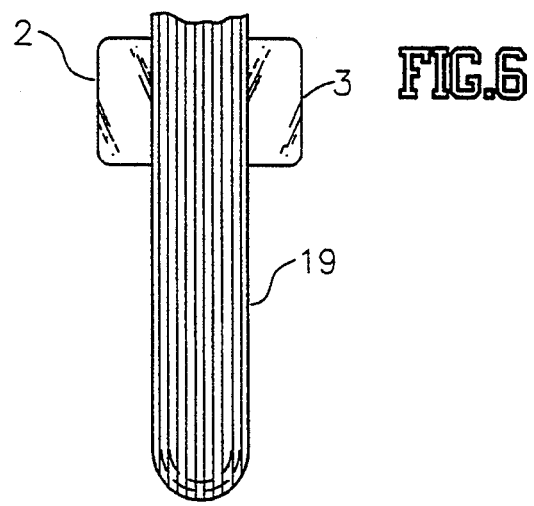
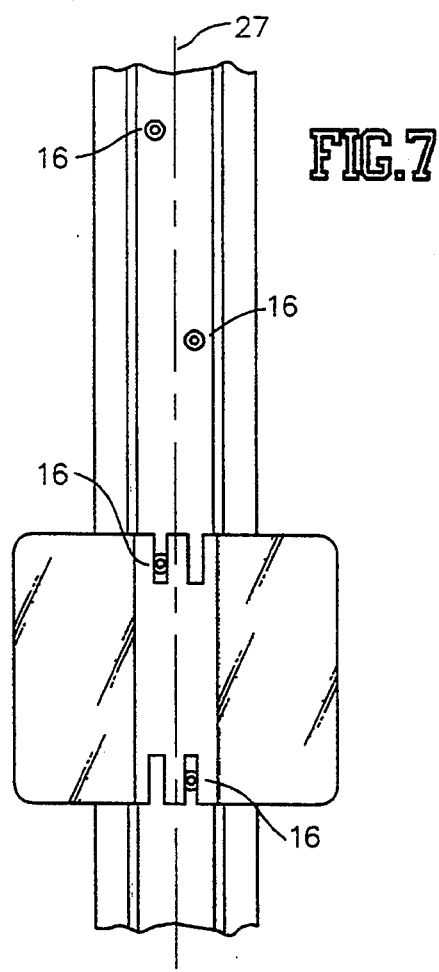
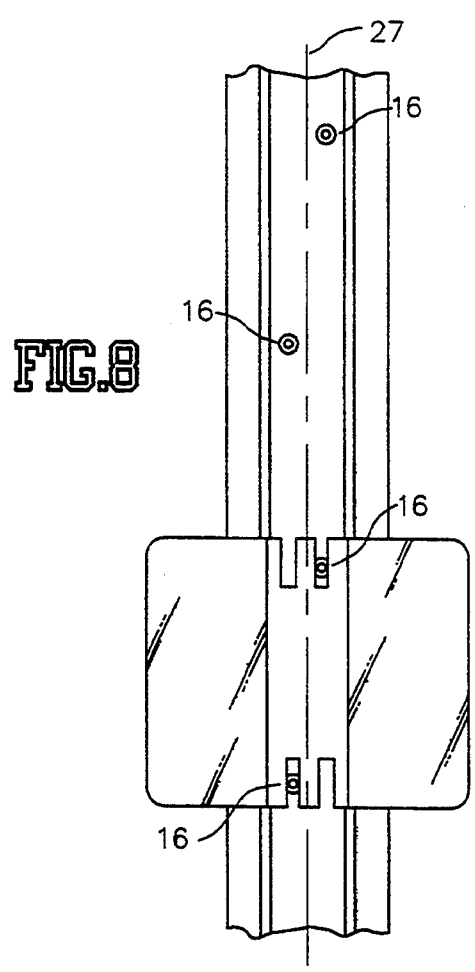

REFLECTING DEVICE

BACKGROUND OF THE INVENTION

1. Field of the Invention:

This invention relates generally to an improved bicycle reflector to increase the visibility of the bicycle to on-coming and over-taking drivers In particular, this invention relates to devices for attachment to the wheel of a bicycle to reflect headlights of approaching vehicles and thus make the presence of the bicycle known to the other driver.

2. Description of the Prior Art:

The need for bicycle wheel reflectors has been known for a long time and various means to affix them to the spoked wheel of the bicycle have been disclosed, such as Ralph J. Trebnick U.S. Pat. No. 4,878,734, via a complex series of revolving blocks powered by the wheel of the bicycle.

The prior efforts at solving the problem of front/rear visibility of bicycles failed to provide a simple device, which is internally adaptable to fit all bicycles wheels, and maximizes the recognition of the bicycle to the other driver, while not inhibiting the free travel of the bicycle wheel. These objects are accomplished by the subject invention, in that it is of a rigid material, equipped with two sets of two grooves of sufficient length to accommodate the spacing of spokes along the arc of the wheel rim on full-sized adult and on smaller children's bicycles, running from either side of the midpoint of opposite edges of the device, so that one groove of each set can engage the spoke of the bicycle wheel just above the nut attaching the spoke to the wheel rim, and the face of one side of the device is provided suitable reflective material of a color on one half contrasting to that applied to the other half and the reverse face being provided with the same reflective colors, but reversed, so that the colors contrast back-to-back and side-to-side. Thus the objects of the invention are accomplished by the flashing of contrasting reflecting faces to the front and rear of the bicycle when it is in motion. A side visible reflector means is provided by the two wings of the plane of the invention diverging 10 to 20 degrees away from horizontal from its apex at the center of the wheel rim.

SUMMARY OF THE INVENTION

The foregoing objectives are satisfied by this invention, and it is internally adaptable to all bicycle spoke wheels by means of alternate baits of slots running from near the apex of the wings a sufficient distance into the plane of the device so as to accommodate spokes from various types of bicycles. One of the slots of the pair on one side of the device is located adjacent to the apex, center-line, of the device and the other slot of the pair is spaced a sufficient distance from the center apex of the device to align with the spacing of spokes on either side of the centerline of the arc of modern bicycles wheel rims. The location of the slots of the pair on the other side of the device are reversed so that the slot of each pair adjacent to the center apex is on the opposite side of the center apex from the other, Thus, this invention can be readily installed on older bicycles having spokes installed close to the centerline of the rim and alternating on each side of the centerline, as well as modern bicycles whereon the spokes are installed at a greater distance from the centerline of the rim, The slots are of sufficient length to accommodate the distance between the spokes of full-sized adult bicycles and smaller children' bicycles. The material from which the device is formed can be of rigid material such as plastic, which has some limited elasticity so that the width of the slots can be slightly less than the external diameter of the spokes so that the slots securely engage the spokes. Of course centripetal force maintains the device in position against the top of the nuts which secure the spokes to the wheel rim.

The wings on the same side of the device having a reflective material of contrasting colors and the wings on the opposite side of the device having the same reflective material with the contrasting colors reversed results in a flashing and alternating of the reflective surfaces when illuminated and the bicycle wheel is in motion so that it acts much like a strobe light in attracting the attention of approaching drivers, with material such as plastic which the colored reflective may be formed in the material of the wings of the device. As the wings of the device extend beyond the diameter of the bicycle tire, but not so much as to interfere with the free travel of the tire, the flashing reflector is visible constantly. The 10-20 degree bend in the plane of the device, so that the wings diverge from the horizontal in relation to the diameter of the bicycle wheel, allows the flashing reflector to be seen from the side also.

The novel features of the invention will be best understood from the following description in light of the accompanying drawings. While particular embodiments of the present invention are shown and described, it will be obvious to those skilled in the art that changes and modifications may be made without departing from this invention in its broader aspects and, therefor, the aim of the appended claims is to cover all such changes and modifications as fall within the true spirit and scope of this invention.

BRIEF DESCRIPTION OF THE DRAWINGS

FIG. 1 is a plane view of the outside face of the bicycle reflector according to my invention.

FIG. 2 is a plane view of the inside face of the bicycle reflector according to my invention.

FIG. 3 is an end view of the bicycle reflector according to my invention.

FIG. 4 is an end view of the bicycle reflector according to my invention installed on two spokes of a bicycle wheel.

FIG. 5 is a side elevational view of the bicycle reflector according to my invention installed on two spokes of a bicycle wheel.

FIG. 6 is a rear view of a bicycle wheel with the bicycle reflector according to my invention installed.

FIG. 7 is an overhead plane view of my invention installed on a modern bicycle rim FIG. 8 is an overhead plane view of my invention installed on an older bicycle rim.

DESCRIPTION OF THE PREFERRED EMBODIMENTS

With reference to the drawings and particularly FIGS. 1 and 2 thereof, the preferred embodiment of the bicycle reflector is shown having a overall rectangular shape. FIG. 1 shows the outside face of the bicycle reflector(1), as would be seen from the rear of the bicycle upon whose wheel it was installed, having a left wing (2) and right wing (3) which diverge from the center apex (15) 10-20 degrees (14) from the horizontal in relation to the diameter of the bicycle tire(19) and are of sufficient width so that each wing extends beyond the outside diameter of the tire (19) a distance that is less than the space between the tire and the rear wheel frame of the bicycle, the two ends of the bicycle reflector having a slot(6) on one side adjacent to the center apex(15) and a slot (7) on the other side a distance from the center apex(15) sufficient to align with the off-set of spokes(16) from the centerline(27) of modern bicycle wheel rims(18). The distance between the slots(6), (9) match the off-set distance between the spokes and the centerline(27) of the wheel rim of older bicycles, being near the centerline of the rim and alternating on either side thereof, while the distance and alignment between the slots(7), (8) match the distance between modern bicycle wheels, wherein the spokes (16) are located farther from the center-line of the wheel rim.

With continued reference to FIGS. 1 and 2, the reflecting faces are disclosed, first with reference to the outside face of the bicycle reflector (1), being comprised of a left wing (2) with a suitable reflecting material, of a color (4) and a right wing (3) with the same reflective material of a contrasting color (5). The inside face of the bicycle reflector(25) having the reverse side(10) of the left wing(2) with the same reflective material having a color (13) which is the same color as (5) the right wing (3) and the reverse side (11) of the right wing (3) with the same reflective material having a color (12) which is the same color as (4) of the left wing(2), so that the rotation of the bicycle wheel will impart a flashing and alternating of reflective colors to draw the attention of approaching drivers.

FIGS. 3, 4, 5, 7, and 8 show the manner of installation of the bicycle reflector on the spokes of a bicycle wheel. Only one slot(9), (6) at either end of the bicycle reflector engages one of the spokes(16) of the bicycle wheel while the other slot(8), (7) remains empty. The distance between the slots at either end of the bicycle reflector match the distance(20) between the spokes(16) along the arc of the bicycle wheel rim(18) and the distance between slots (6) and (7) match the stagger distance (26) between the spokes(16) across the diameter of the bicycle wheel rim(18). The bicycle reflector slots(6), (9) rest on the top of the nuts(17) which attach the spokes (16) to the bicycle wheel rim (18). Where the bicycle reflector is constructed of a rigid elastic material such as plastic, the width of the slots (6), (7), (8), and (9) is slightly less than the outside diameter of the spokes (16) so that the bicycle reflector is held securely on the spoke(16) by the elasticity of the material, combined with the centripetal force of the rotation of the wheel.

FIG. 6 is an expanded view of the bicycle reflector showing the extension of the reflective wings (2), (3) beyond the outside diameter of the bicycle tire (19).

With reference to FIGS. 7 and 8, the invention is shown installed on bicycle wheels having different alignment of spokes (16) on either side of the centerline (27) of the wheel rim(18).

I claim:

1. An improved bicycle reflector being comprised of a rectangular plate means having a means for attaching said improved bicycle reflector to modern bicycle wheels equipped with spokes, a means for securely holding the bicycle reflector to the spokes of a bicycle wheel, and a reflector means to impart a flashing signal to an approaching automobile driver at night, said rectangular plate means being comprised of suitably rigid elastic material, such as plastic, being divided at its center apex into a left wing and a right wing, in which said wings diverge in the same direction from said center apex ten to twenty degrees from the horizontal and are of sufficient width so that each wing will extend beyond the diameter of a bicycle tire a distance less than the space between a bicycle tire and a bicycle rear wheel frame, and said means for attaching the improved bicycle reflector to bicycle wheels equipped with spokes being comprised of two pairs of slots, of sufficient length to accommodate the difference in distance between spokes of a full-sized adult bicycle and on a smaller children's bicycle, having a width slightly less than the outside diameter of a spoke of a bicycle so that the slot is spread to accommodate the spoke and securely holds it, with one of the slots of each pair located adjacent to the center apex and the other slot located on the other side of the center apex a sufficient distance away form the center apex so as to align with the location of spokes on either side of the centerline of a modern bicycle wheel rim, while the remaining slots of the two pairs are located on the opposite side of the reflector and on the side of the center apex opposite to its mate, the length of the slots being sufficient to accommodate the distance between spokes along the arc of the bicycle wheel rim of full-sized adult bicycles and smaller children's bicycles, so that the improved bicycle reflector rests on the top of standard nut means for attaching spokes to rims of bicycles and is held in place, when the wheel is in motion, by centripetal force in addition to the gripping of the slots on the spokes, and said reflector means being comprised of, either a suitable reflective material, being applied to both sides of the wings, or by being cast in the material of the wings of the improved bicycle reflector by standard means, with the color of the reflective on two wings of the same face of improved bicycle reflector being of contrasting colors, while the two wings of the reverse side of the improved bicycle reflector have the contrasting colors reversed so that when the improved bicycle reflector is installed on a bicycle spoked wheel and it is in motion, the reflective color changes left to right, and back, so as to impart a flashing presentation which draws the attention of approaching drivers at night.

* * * * *